Dec. 3, 1946.                I. W. ENGLAND ET AL                2,411,991
           APPARATUS FOR INTERIORLY INSPECTING OPAQUE CONTAINERS
                    Filed July 24, 1941             6 Sheets-Sheet 1
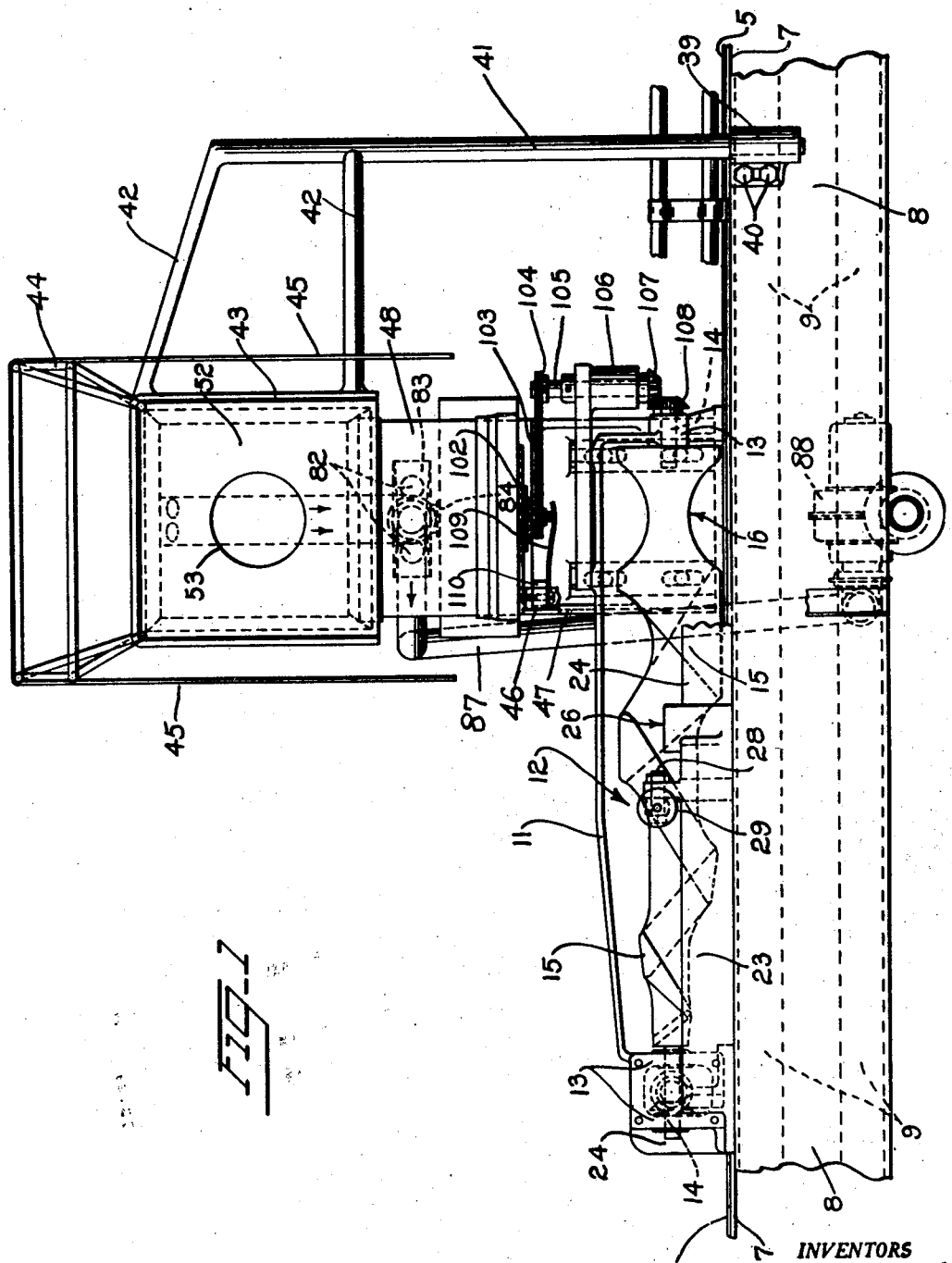
INVENTORS
Isaac W. England
William F. Bunte
BY
Mason & Porter
Attorneys

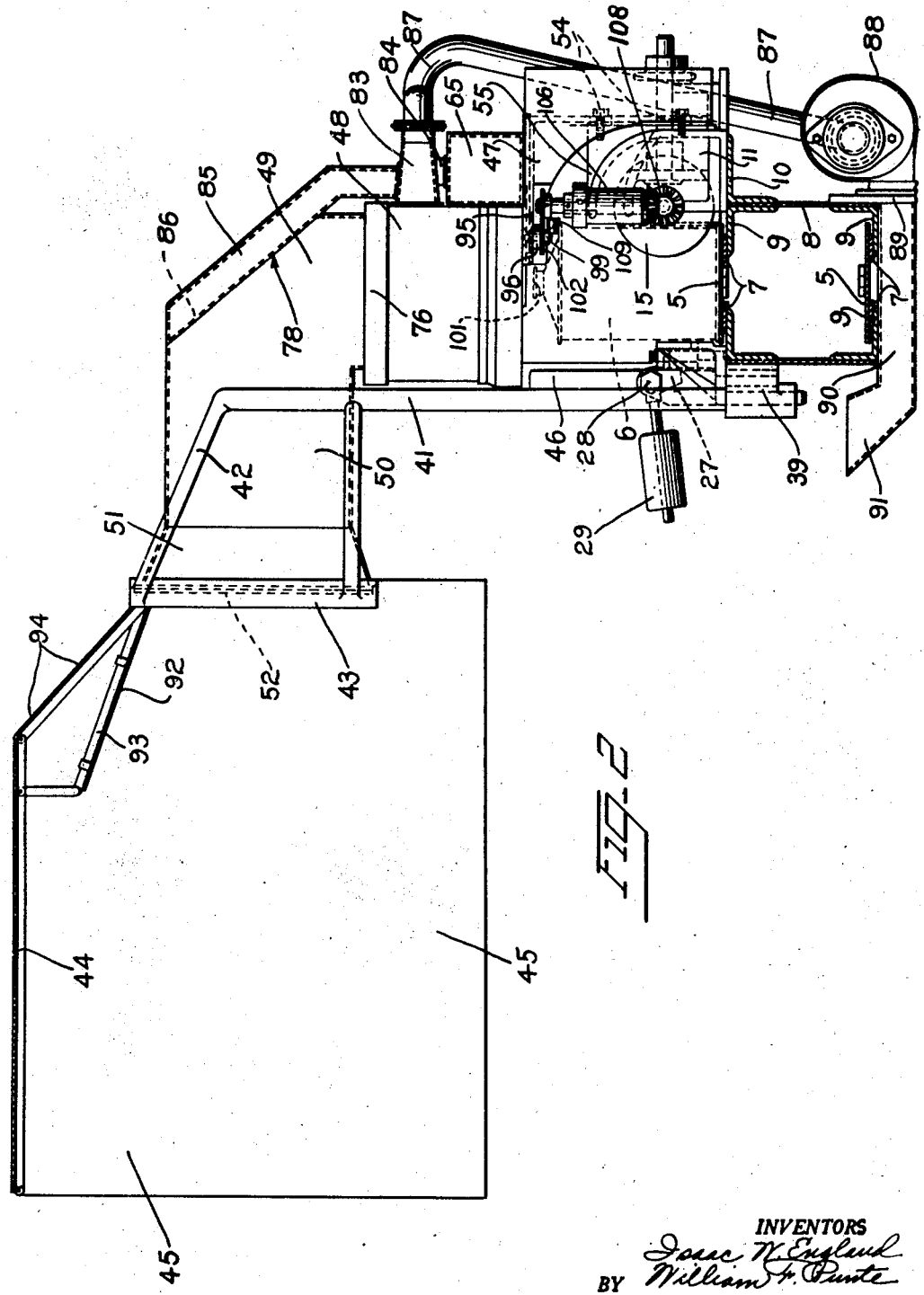

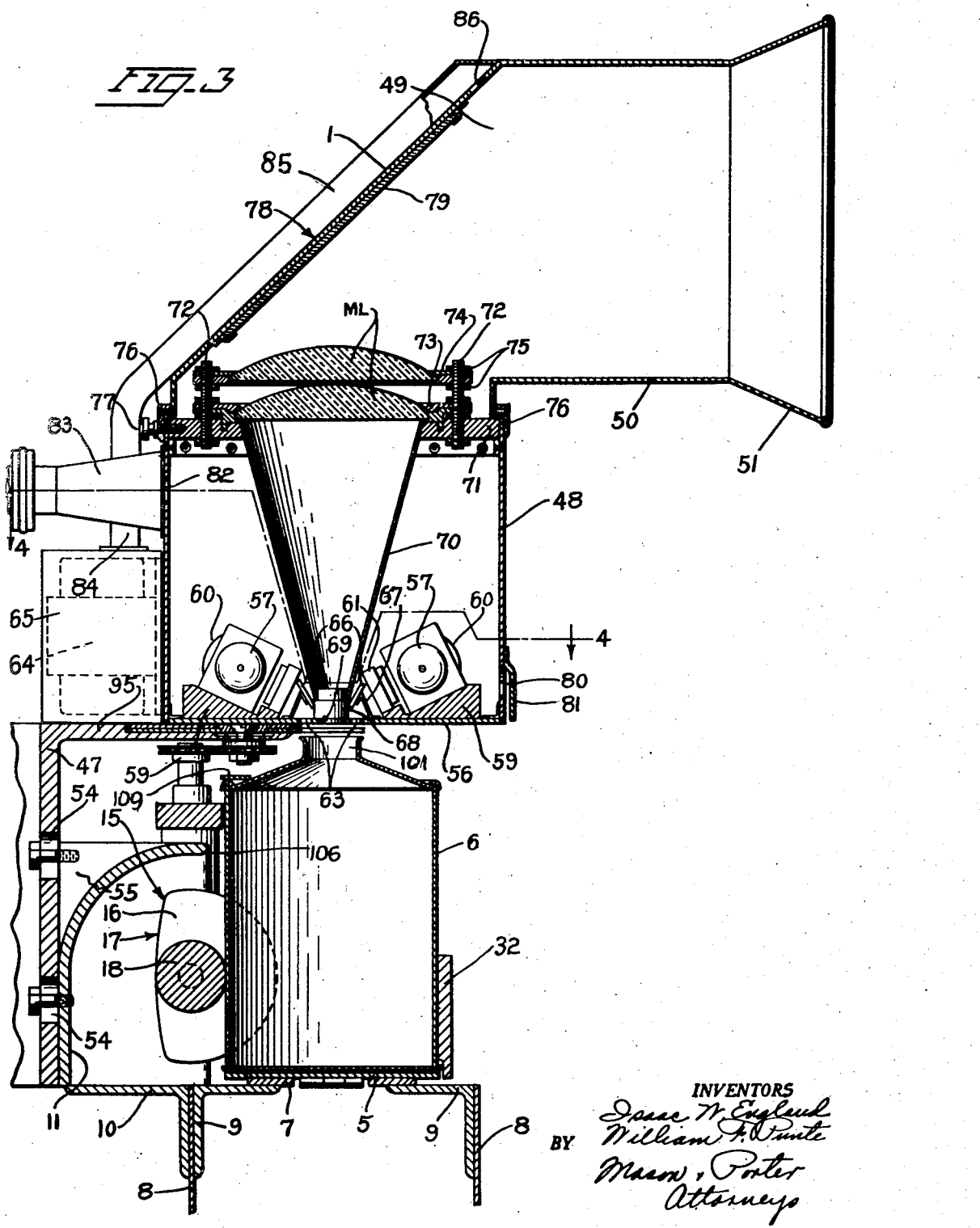

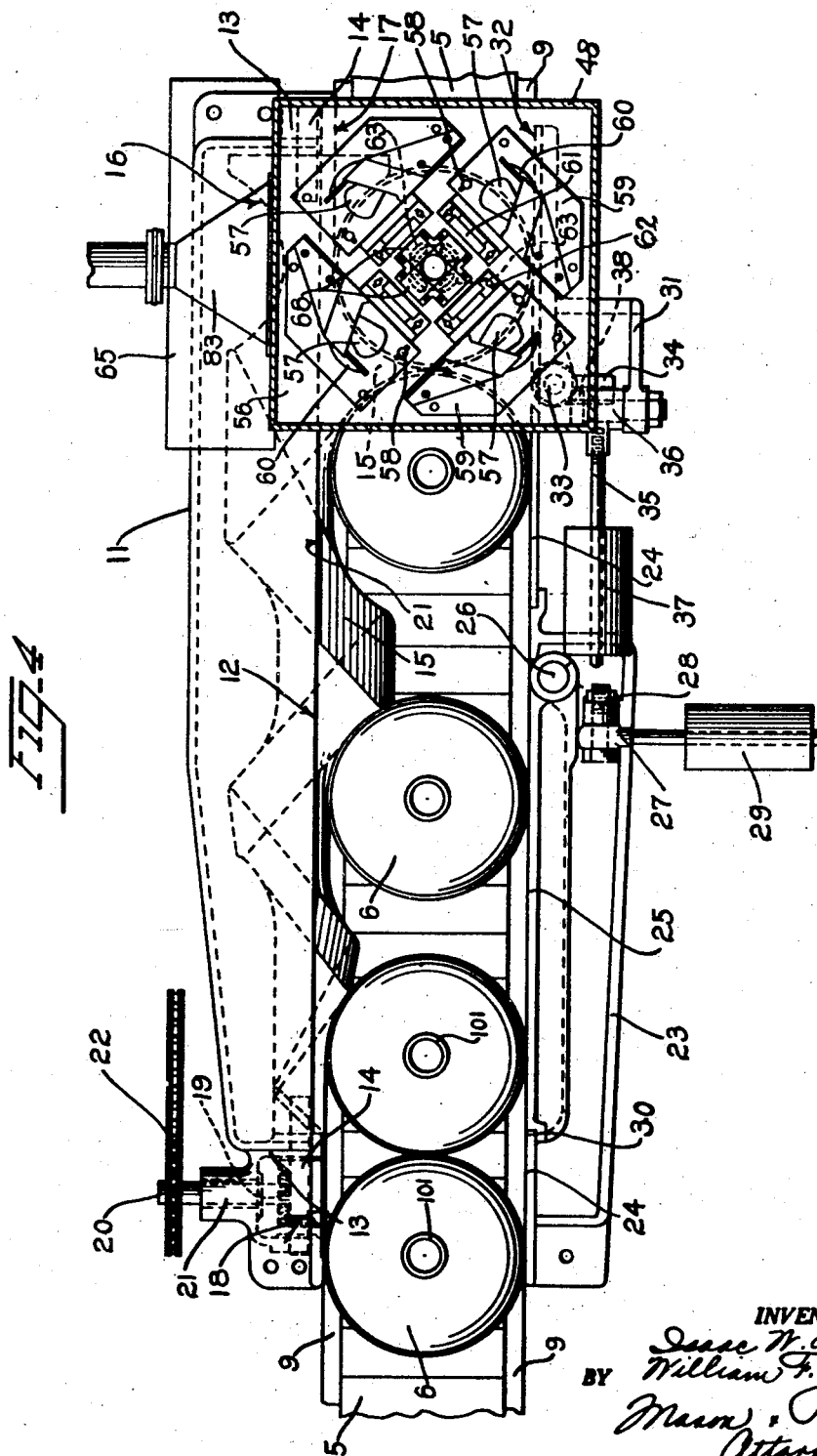

Dec. 3, 1946.   I. W. ENGLAND ET AL   2,411,991
APPARATUS FOR INTERIORLY INSPECTING OPAQUE CONTAINERS
Filed July 24, 1941   6 Sheets-Sheet 5
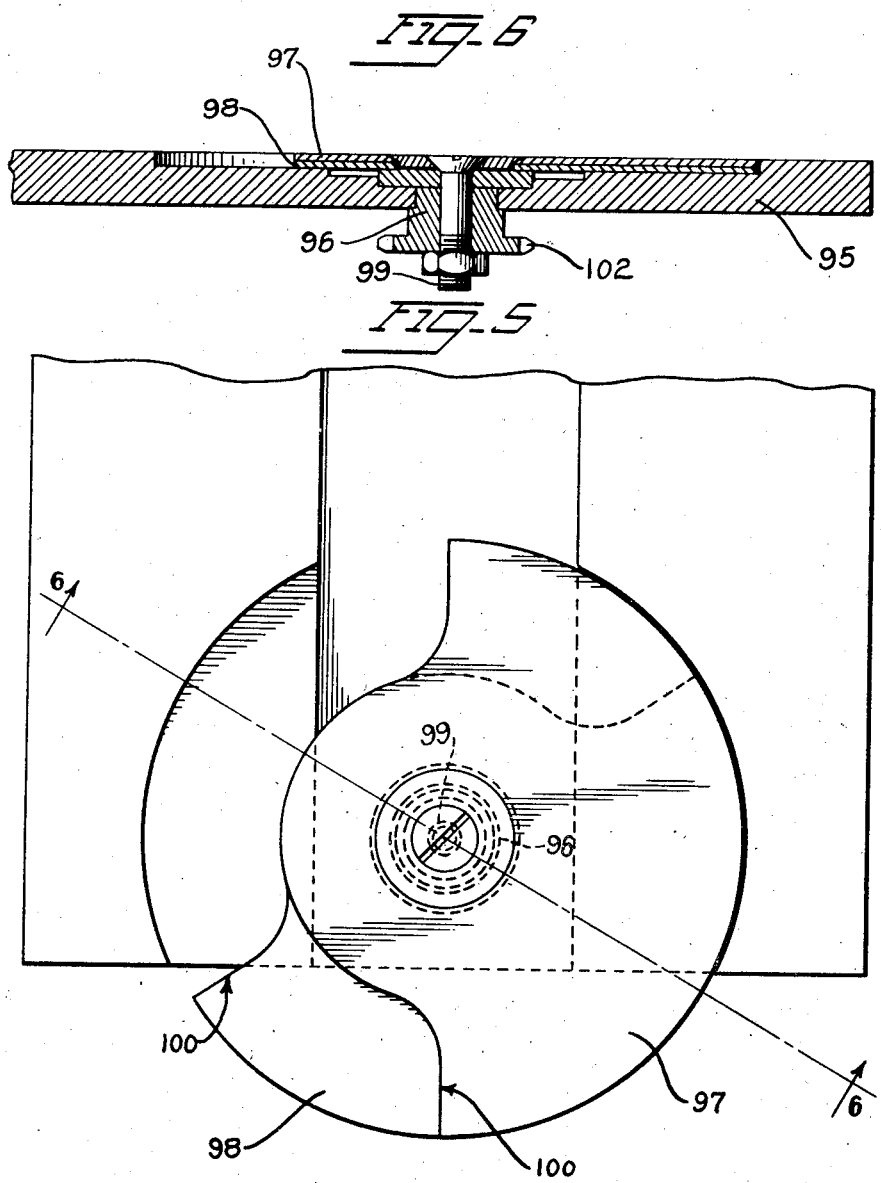
INVENTORS
Isaac W. England
William F. Ponte
BY
Mason & Porter
Attorneys

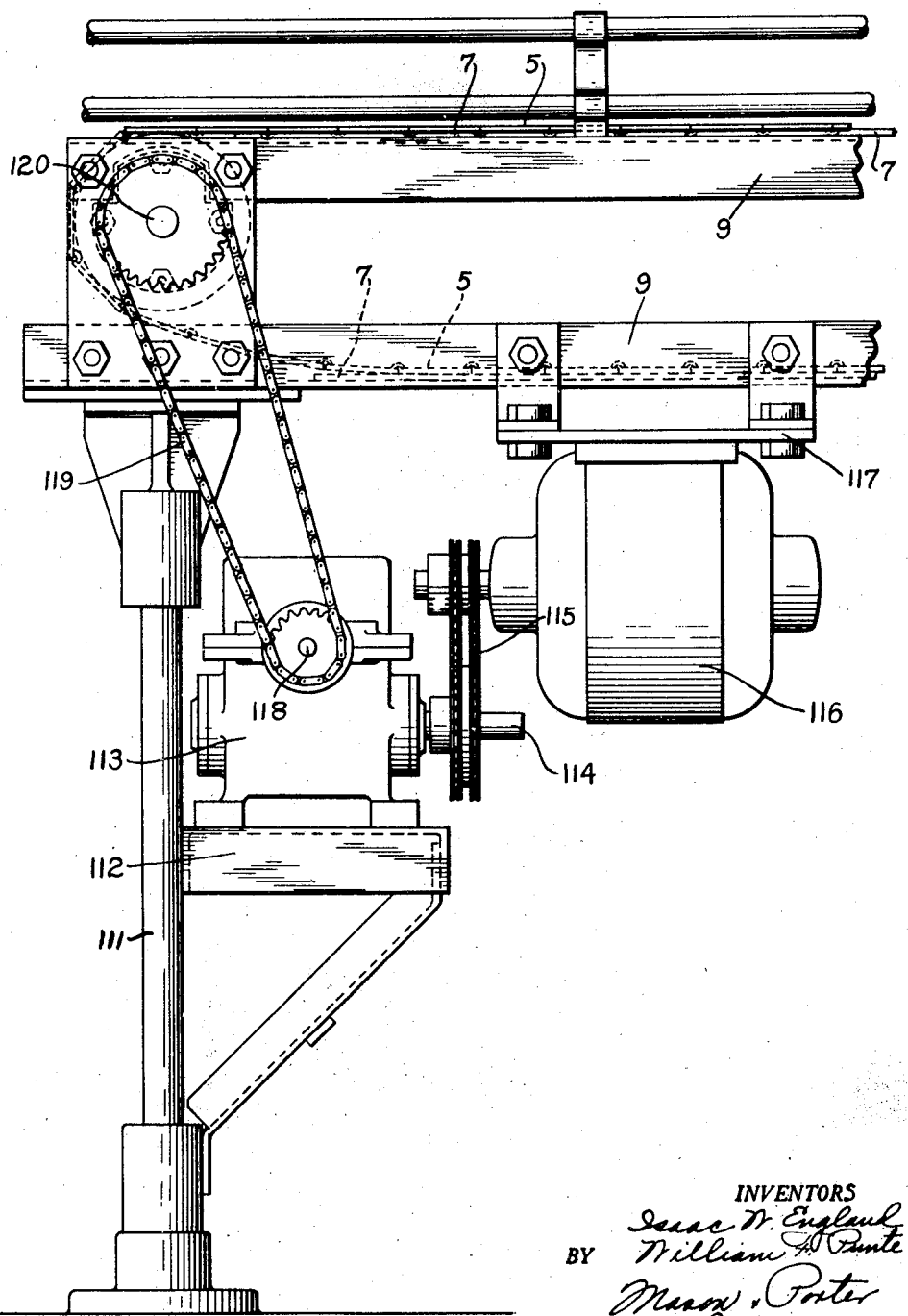

Patented Dec. 3, 1946

2,411,991

UNITED STATES PATENT OFFICE 2,411,991

APPARATUS FOR INTERIORLY INSPECTING OPAQUE CONTAINERS

Isaac W. England, Passaic, N. J., and William F. Punte, Syracuse, N. Y., assignors to Continental Can Company, Inc., New York, N. Y., a corporation of New York Application July 24, 1941, Serial No. 403,912

16 Claims. (Cl. 88—14)

1

The invention relates generally to inspection apparatus and primarily seeks to provide a novel apparatus which will enable an operative to rapidly and efficiently inspect, by sight, the interiors of opaque containers in order to insure against the filling with food products or beverages any containers which might have bits of debris or foreign matter therein.

In its more detailed nature the invention resides in providing a sight inspection apparatus of the nature stated wherein is embodied a sighting station, means for feeding containers to and from said station, means for holding each container thus fed for an inspecting interval at said station, means for hooding or shielding the eyes of an operative from outside light, means at the sighting station for projecting light into the open top of each container held at the sighting station, and means through which an operative at said sighting station can directly inspect the interior of each said container through said open top.

An object of the invention is to provide a novel means for projecting the interior illuminating light into each container through the same top opening therein through which the sight inspection thereof is made.

Another object of the invention is to provide novel means for illuminating the interiors of the containers in a particularly efficient manner, and means for considerably magnifying the illuminated interior of each container as it is inspected by the eyes of the operative.

Another object of the invention is to provide an apparatus of the character stated including a novel shutter structure effective to shield the eyes of the operative from light ray reflections from container parts other than the interiors thereof as the containers are being moved to and from the sighting station.

Another object of the invention is to provide an apparatus of the character stated in which the container feeding means includes a continuously moving belt chain or similar conveyor, and a timing screw for spacing the containers along the travelling chain belt as they approach the sighting station, said screw including an annular dwell groove portion effective to temporarily hold individual containers to be inspected at the sighting station.

With the above and other objects in view that will hereinafter appear, the nature of the invention will be more fully understood by following the detailed description, the appended claims, and the several views illustrated in the accompanying drawings.

2

In the drawings:

Figure 1 is a side elevation illustrating an apparatus embodying the invention, parts being broken away.

Figure 2 is an end elevation illustrating the container inspecting apparatus, the container feedway being illustrated in vertical cross section.

Figure 3 is a vertical cross section taken through the center of the apparatus at the inspection station.

Figure 4 is a horizontal section taken on the line 4—4 on Figure 3.

Figure 5 is a detail plan view illustrating the adjustable shutter.

Figure 6 is a vertical cross section of the shutter taken on the line 6—6 on Figure 5, a fragment of the shutter supporting shelf also being shown.

Figure 7 is a fragmentary side elevation illustrating one form of chain belt driving means.

In the apparatus herein disclosed as an example of embodiment of the invention there is included a continuously travelling chain belt 5 or equivalent conveyor structure for moving the containers to be inspected in a line after the fashion customary and well known in the container manufacturing industry. The containers conveyed in a line by the belt 5 are designated 6 and the belt passes over guides 7 along a suitable frame structure, in this instance constituting a box framing 8 including longitudinal corner angle irons 9.

To one of the upper angle irons 9 is attached an extension angle or shelf 10 on which is supported a timing screw housing 11. The housing 11 is open, as at 12, at the side thereof disposed toward the conveyor belt 5 and is equipped with bearings 13 for rotatably supporting the trunnions 14 at the ends of the timing screw 15. The spiral thread on the timing screw intercepts the containers 6 being moved in line on the belt 5 and serves to time the movement thereof toward the inspecting station and to space the moving containers and present them one by one at said station.

It is intended that each container should come to rest for a suitable inspecting interval at the inspection station, and for this purpose the timing screw is equipped with an annular dwell groove 16. As each container moves into the dwell groove 16 it is held thereby for the inspection interval mentioned. At its delivery end the screw is equipped with a clearance 17, and each time this clearance is turned into opposition to the container feedway it releases the container which has been held at the inspection station and the inspection of which has been completed, and permits the belt to take it away.

The screw trunnion at the receiving end of the screw is equipped with a bevel gear 18 which is driven by a bevel gear 19 mounted on a stub shaft 20 rotatable in a bearing 21 provided therefor in the housing 11, and the stub shaft 20 is driven by sprocket and chain connections 22 from any suitable source of power (not shown). It is to be understood that the belt 5 travels rapidly relative to the pitch and speed of rotation of the timing screw 15 so that the screw serves a spacing and timing function rather than a feeding function as will be obvious by reference to Figure 4 of the drawings.

Opposed to the receiving end of the screw 15, there is mounted a bracket 23 equipped with fixed container travel-way defining wall portions 24. The bracket 23 also carries a yieldable wall 25 which is pivoted about a vertical axis, as at 26, on said bracket and is constantly urged toward the travelling containers by a bell crank arm 27, pivoted, as at 28, on the bracket 23 and equipped with a weight 29. Movement of the wall 25 toward the containers is limited by contact of said wall, as at 30, with one of the fixed wall portions 24 as illustrated in Figure 4.

Another bracket 31 is fixedly supported on the framing opposite the container travel-way, and this bracket supports another yieldable wall 32 which opposes the containers at and adjacent the inspection station. The wall 32 is pivoted about a vertical axis 33 on the bracket 31 and includes an abutment arm extension 34 engaged by a bell crank lever 35 pivoted, as at 36, on the bracket and weighted, as at 37. The yieldable wall 32 is limited against greater than desired inward movement by abutment means 38.

Just beyond the inspection station a socket bearing 39 is vertically-adjustably secured, as at 40, to one of the frame angle irons 9, and the vertical bore or socket of this bearing serves to swingably mount a hood supporting standard 41. The standard 41 carries supporting arm extensions 42 which serve to position a rectangular sighting frame 43 at the inspection station. Additional frame pieces 44 extend laterally from the sighting frame 43 and serve as a supporting means for a light shielding cloth or hood 45.

At the sighting station and directly over the longitudinal center of the belt, on suitable framing 46 and on framing 47 supported indirectly on the shelf 10, is mounted a light projecting housing 48 which communicates upwardly into a sighting housing 49 having a horizontal extension 50 terminating in a flare 51 disposed at the sighting frame 43. A focusing shield 52 is mounted in the end of the flare 51 or in the sighting frame 43, preferably the latter, and this shield is equipped with a limited diameter sight opening 53. It will be understood that the cloth hood structure 45 shields the apparatus against ingress of outside light, and the focusing shield serves to shut out any light which might penetrate the cloth and also to facilitate direct perception by the operative of the interior of the container in a manner later to be described.

The framing 47 is preferably vertically-adjustably mounted, as at 54, on an extension 55 from the screw housing 11.

Within the light projecting housing 48 and on the base 56 thereof is mounted a plurality (four being shown) of lamps or light sources 57 each of which is adjustably mounted, as at 58, on an insulator block 59 and backed by a reflector 60.

The light from each lamp 57 is projected through a condensing lens set 61 adjustably mounted, as at 62, on the respective block 59 through an individual arcuate opening 63 formed in the base 56 and into the bottoms of the containers serially presented at the inspection station. The lamps 57 are supplied with electrical current from a suitable source (not shown) through transformers 64 which are disposed outside the housing 48 in a separate housing 65.

The light projected from the lamps 57 into the bottoms of the containers 6 is not projected directly into said containers but passes through the condensing lenses 61 and is reflected thereinto by individual mirrors 66 supported at the proper angle, as at 67, about a lens 68 centered over the axis of a container presented at the inspection station and in a center aperture 69 formed in the base 56.

The lens 68 is carried at the bottom end of a sighting cone 70 supported at its upper end in an aperture in a ring or top plate 71 forming the upper limit of the housing 48. The ring 71 carries a plurality of threaded posts 72 surrounding the top of the cone and projecting upwardly from said ring. The posts serve to support lower and upper mounting ring sets respectively designated 73 and 74, said ring sets being adjustably mounted on the posts 72, as at 75, so that the vertically spaced relation of said ring sets can be adjusted. The ring sets 73, 74 carry image magnifying lenses ML, which can be properly focused by adjustment of the ring sets.

The sighting housing 49 is mounted on top of the light projecting housing 48 through the medium of a base ring 76, being removably secured to the top ring 71 and to the housing 48 as at 77. The wall portion of the sighting housing 49 vertically overlying the cone 70 is disposed at an angle, as at 78, so as to support a reflecting mirror 79 at a proper angle for reflecting the light rays from the interior container body bottoms magnified by the lenses ML through the horizontal center of the sighting housing leg 50 toward the flared end 51 thereof and the restricted sighting opening 53 in the focusing shield 52.

The light projecting housing 48 is equipped with breather or air inlet apertures 80 protected against ingress of light and dust by suitable shielding 81, and this housing also is equipped with air draw off apertures 82 leading into a collector 83. The air collector 83 is also connected, as at 84, with the transformer housing 65, and by a duct 85 with the air draw off holes 86 formed in the sighting housing wall 78 above the mirror 79. The air collector 83 also is connected by a duct 87 with the inlet of an evacuating pump 88 mounted, as at 89, on the apparatus framing and having its discharge connected with a duct 90 which delivers through a flared outlet 91 under the light shielding hood 45 beneath which the operative sits while inspecting the containers.

A supplemental shield or hood 92 is supported on a supplemental frame portion 93 and serves to prevent ingress of light beneath the hood 45 through the breather apertures 94 formed in the main hood 45 above said supplemental shield.

By reason of the provision of the breather equipments just above described and the evacuating pump and duct equipments, discomfort of the operative beneath the hood is prevented and clear vision in the sighting operation is assured by prevention of fogging of the reflecting and sighting surfaces.

Means also is provided for protecting the eyes of the operative from reflected flashes of light which would ordinarily result from placement of the containers at the inspection station prior to the inspection and removal thereof from the station after inspection. The top surfaces of the containers usually are somewhat shiny and capable of reflecting objectionable flashes of light to the eyes of the operative while moving in the manner stated. For this purpose a novel shutter structure is provided which is effective to prevent these objectionable reflections of light into the eyes of an operative.

The framing 47 includes a horizontal shelf portion 95 disposed directly beneath the light projecting housing 48. The shelf portion 95 is apertured to rotatably support a stub shaft 96 which carries a rotary shutter comprising a fixed upper plate 97 and a lower plate 98 which is adjustable about the axis of said shaft. The upper and lower plates 97 and 98 are clamped together in their adjusted relation by a bolt 99 which passes through the stub shaft 96 and said plates in the manner best illustrated in Figures 5 and 6 of the drawings. The plates 97 and 98 are equipped with identical edge cutouts 100, and by relatively adjusting the positions of the plates the cutouts compositely formed by the edge recesses 100 can be varied to suit the speed of rotation of the shutter and the interval of rest of each container at the inspecting station thereby to make it possible for the shutter to close the inspection opening at all times except when a container is at rest with its open mouth portion 101 in registry therewith.

A sprocket 102 is affixed to the stub shaft 96 and is driven by a chain 103 from a sprocket 104 mounted on the upper end of a shaft 105 vertically disposed and rotatable in a bearing 106 removably secured upon the screw housing 11 in the manner clearly indicated in Figure 1 of the drawings. A bevel gear 107 is carried at the lower end of the shaft 105 and is driven by a bevel gear 108 affixed to the trunnion at the delivery end of the timing screw 15. By this means rotation is imparted to the shutter 97, 98 in proper timed relation with the timing screw.

In order to additionally assure that each container will be absolutely motionless while being interiorly inspected at the inspection station, there is provided a leaf spring 109 supported, as at 110, on the framing 47 and disposed to engage over a top portion of each container presented at the inspection station in the manner illustrated in Figures 1 and 2 of the drawings.

In operation, containers 6 moving along in a line on the conveyor 5 are intercepted by the timing screw 15 and are spaced thereby in a manner illustrated in Figure 4 and are individually presented and held for a suitable inspection interval by the dwell groove 16 of the screw at the inspection station. While each container is held motionless at the inspection station, the shutter 97, 98, at other times effective to prevent objectionable reflections through the inspection opening, serves to open said opening to the view of an operative positioned beneath the light shielding hood 46.

During each interval of inspection, the light projected from the light sources within light projecting housing 48 is directed through the openings 63 to brightly illuminate the interior of the container being inspected. The illuminated interior of the container at the bottom and the side wall portions thereof to the extent of about two-thirds of the container depth above said bottom is viewed through the photographic lens 68 and magnified by the magnifying lenses ML as the light rays from said interior container portions are reflected by the mirror 79 through the restricted sight opening 53 hereinbefore referred to. In this manner all containers which might contain bits of foreign matter may be readily detected and removed from the line. This may be accomplished manually, or by any suitable mechanical ejecting mechanism (not shown).

As has been previously stated, the container conveyor may be selected from various acceptable forms, and may be driven in any approved manner. The well known chain belt composed of hingedly connected cross slats is preferred, and in Figure 7 there is illustrated one means for driving this belt. In this illustration the frame 8 including the corner angle irons 9 is supported on a frame standard 111. This standard is equipped with a shelf 112 whereon is mounted a speed reduction gearing of any approved design generally designated 113. Rotation is imparted to the power input shaft 114 of this gearing by sprocket and chain connections 115 with a driving motor 116 suspended, as at 117, from the frame 8, 9, and this rotation is transmitted at reduced speed from the power output shaft 118, and through sprocket and chain connections 119, to the belt driving shaft and sprocket mounted at 120 on the frame 8, 9. When the belt is thus driven, the lower flight thereof is supported on guides mounted on the lower pair of angle irons 9.

It is of course to be understood that the details of structure and arrangement of parts may be variously changed and modified without departing from the spirit and scope of our invention.

We claim:

1. In apparatus for interiorly inspecting opaque containers open at one end, a visual inspection station, means for feeding containers to said station with the open ends thereof presented to view at said station, holding them for an inspection interval at said station, and then feeding them from said station, means at said station for effecting a visual inspection of the interiors of the temporarily held containers through the open ends thereof, and spring means engageable with each container held at said station for yieldably gripping and securing it against vibratory movement during the inspection thereof.

2. In apparatus for interiorly inspecting opaque containers open at one end, a visual inspection station, means for feeding containers to said station with the open ends thereof presented to view at said station, holding them for an inspection interval at said station, and then feeding them from said station, means at said station for effecting a visual inspection of the interiors of the temporarily held containers through the open ends thereof, and shutter means for shielding the containers from the visual inspection means at all times except when said containers are motionless at said station.

3. In apparatus for interiorly inspecting opaque containers, a visual inspection station, means at said station for effecting a visual inspection of the interiors of the temporarily held containers, and means for feeding containers to said station, holding them for an inspection interval at said station, and then feeding them from said station, said last named means including a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station and a side clearance effective at the completion of said holding interval to release the container and permit the conveyor to take it away; shutter means for shielding the containers from the visual inspection means at all times except when said containers are motionless at said station; and means for imparting movement to said screw and said shutter means in timed relation.

4. In apparatus for interiorly inspecting opaque containers, a visual inspection station, means at said station for effecting a visual inspection of the interiors of the temporarily held containers, and means for feeding containers to said station, holding them for an inspection interval at said station, and then feeding them from said station, said last named means including a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station and a side clearance effective at the completion of said holding interval to release the container and permit the conveyor to take it away; a rotary shutter disc for shielding the containers from the visual inspection means at all times except when said containers are motionless at said station; means for rotating the screw; and means for connecting the shutter disc and the screw to rotate in unison and in constantly timed relation.

5. In apparatus for interiorly inspecting opaque containers, a visual inspection station, means at said station for effecting a visual inspection of the interiors of the temporarily held containers, and means for feeding containers to said station, holding them for an inspection interval at said station, and then feeding them from said station, said last named means including a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station and a side clearance effective at the completion of said holding interval to release the container and permit the conveyor to take it away; a rotary shutter disc for shielding the containers from the visual inspection means at all times except when said containers are motionless at said station; means for rotating the screw; and means for connecting the shutter disc and the screw to rotate in unison and in constantly timed relation, said shutter disc including a pair of plates superposed and having sighting clearances therein and being relatively adjustable to vary the size of the effective sighting clearance compositely formed by the individual plate clearances.

6. In apparatus for interiorly inspecting opaque containers, a visual inspection station, means for supporting containers uprightly at said station with their open tops uppermost for visual inspection, a light projecting housing overlying said station, a sighting housing extension overlying the light projecting housing and including a generally horizontally directed portion, means in said light projecting housing for projecting light into the interiors of containers supported at said station, and means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative.

7. In apparatus for interiorly inspecting opaque containers, a visual inspection station, means for supporting containers uprightly at said station with their open tops uppermost for visual inspection, a light projecting housing overlying said station, a sighting housing extension overlying the light projecting housing and including a generally horizontally directed portion, means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, and means for evacuating air from said housing and its extension.

8. In apparatus for interiorly inspecting opaque containers, a visual inspection station, means for supporting containers uprightly at said station with their open tops uppermost for visual inspection, a light projecting housing overlying said station, a sighting housing extension overlying the light projecting housing and including a generally horizontally directed portion, means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, an outside light excluding hood for projecting over and shielding an operative making visual inspections before said generally horizontal portion, and means for evacuating air from said housing and its extension and directing the same under said hood.

9. In apparatus for interiorly inspecting opaque containers, a visual inspection station, means for supporting containers uprightly at said station with their open tops uppermost for visual inspection, a light projecting housing overlying said station, a sighting housing extension overlying the light projecting housing and including a generally horizontally directed portion, means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, an outside light excluding hood for projecting over and shielding an operative making visual inspections before said generally horizontal portion, a frame supporting said hood, and means swingably mounting said hood so that it can be swung to and from cooperative relation to the generally horizontal portion without disturbing other parts of the apparatus.

10. In apparatus for interiorly inspecting opaque containers, a visual inspection station, a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station with its open top uppermost and a side clearance effective at the completion of said holding interval to release the container and permit the conveyor to take it away, a light projecting housing overlying said station, a sighting housing extension overlying the light projecting housing and including a generally horizontally directed portion, means in said light projecting housing for projecting light into the interiors of containers supported at said station, and means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative.

11. In apparatus for interiorly inspecting opaque containers, a visual inspection station, a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station with its open top uppermost and a side clearance effective at the completion of said holding interval to release the container and permit the conveyor to take it away, a light projecting housing overlying said station, a sighting housing extension overlying the light projecting housing and including a generally horizontally directed portion means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, a rotary shutter disposed to have a portion thereof movable at times over the open top of a container held at said station and means for rotating the screw and the shutter in timed relation so that the shutter is opened to permit said light projection into a container interior and said receiving and enlarged focusing of light rays from a container interior only when a container is stationary at said inspection station.

12. In apparatus for interiorly inspecting opaque containers, a visual inspection station, a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station with its open top uppermost and a side clearance effective at the completion of said holding interval to release the container and permit the conveyor to take it away, a light projecting housing overlying said station, a sighting housing extension overlying the light projecting housing and including a generally horizontally directed portion, means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, a rotary shutter disposed to have a portion thereof movable at times over the open top of a container held at said station, means for rotating the screw and the shutter in timed relation so that the shutter is opened to permit said light projection into a container interior and said receiving and enlarged focusing of light rays from a container interior only when a container is stationary at said inspection station, means providing a restricted sighting opening through which said operative can effect said direct sight inspection, and an outside light excluding hood for projecting over and shielding said operative when making visual inspections through said sighting opening.

13. In apparatus for interiorly inspecting opaque containers, a visual inspection station, a travelling conveyor constantly tending to feed containers in a line to and past said station, a timing screw paralleling said conveyor for intercepting the container line and spacing the containers so that they will be presented one by one at said station, said screw having an annular groove therein effective to hold each container for an inspection interval at said station with its open top uppermost and a side clearance effective at the completion of said holding interval to release the container and permit the conveyor to take it away, a light projecting housing overlying said station, a sighting housing extension overlying the light projecting housing and including a generally horizontally directed portion means in said light projecting housing for projecting light into the interiors of containers supported at said station, means in said housing and extension for receiving through the same open tops light rays from the interior portions of the container and effective for focusing said rays for direct sight inspection at an enlarged scale by an operative, said latter means including means for reflecting the focused light rays through said generally horizontal portion to be visually inspected by the operative, a rotary shutter disposed to have a portion thereof movable at times over the open top of a container held at said station, means for rotating the screw and the shutter in timed relation so that the shutter is opened to permit said light projection into a container interior and said receiving and enlarged focusing of light rays from a container interior only when a container is stationary at said station, means providing a restricted sighting opening through which said operative can effect said direct sight inspection, an outside light excluding hood for projecting over and shielding said operative when making visual inspections through said sighting opening, and means for evacuating air from said housing and its extension and directing the same under said hood.

14. In apparatus for interiorly inspecting opaque containers which are relatively deep and have restricted pouring throats at their upper extremities, a light excluding housing having a floor and side walls and a limited area inspection opening in said floor surrounded by light directing openings, means for moving containers past and beneath the housing with their throats centered on and close to said inspection opening, means for stopping each container for a limited inspection interval beneath said inspection opening, light sources arranged in said housing, reflecting means arranged adjacent the inspection opening in position for reflecting light from said sources through the light directing openings into all parts of the bottom of a container stopped beneath the inspection opening, means centered over the inspection opening for receiving through the inspection opening and focusing the light rays from each container bottom under inspection, and a sighting window in said housing through which the focused light rays are viewable.

15. An apparatus as defined in claim 14 in which there is included a shutter operable to alternately open and close the inspection opening, and means to operate the shutter so that it will open the inspection opening only when a container is stationary therebeneath.

16. An apparatus as defined in claim 14 in which there is included a horizontal extension of the upper part of the housing, in which the sighting window is disposed vertically in said housing extension, and in which there is included an angularly disposed mirror in the housing which is effective to reflect the focused light rays to the vertically disposed window.

ISAAC W. ENGLAND.
WILLIAM F. PUNTE.